United States Patent [19]

Kondo

[11] Patent Number: 5,196,882
[45] Date of Patent: Mar. 23, 1993

[54] MAGNETIC RECORDING COLOR MICROCAPSULE AND A MAGNETIC RECORDING DEVICE USING THE SAME

[75] Inventor: Nobuhiro Kondo, Tokyo, Japan
[73] Assignee: Seikosha Co., Ltd., Tokyo, Japan
[21] Appl. No.: 882,404
[22] Filed: May 13, 1992

Related U.S. Application Data

[62] Division of Ser. No. 799,534, Nov. 27, 1991.

[30] Foreign Application Priority Data

Nov. 28, 1990 [JP] Japan ................................. 2-327878

[51] Int. Cl.⁵ .............................................. G03B 27/52
[52] U.S. Cl. ...................... 355/27; 346/74.2; 358/301; 355/212; 355/271
[58] Field of Search .......... 355/212, 271, 27; 346/74.2–74.7; 358/301

[56] References Cited

U.S. PATENT DOCUMENTS 4,646,108 2/1987 Guerin .................... 346/74.7
4,956,649 9/1990 Sakai et al. .................. 346/107 R Primary Examiner—Michael L. Gellner
Assistant Examiner—D. Rutledge
Attorney, Agent, or Firm—Jordan and Hamburg

[57] ABSTRACT

A magnetic recording device includes a magnetic latent image on a latent image carrier and a developing device for moving a magnetic recording color microcapsule onto the magnetic latent image carrier, the microcapsule including a colored material covered with an outer wall and a magnetic material disposed on the outer wall. A transfer device transfers the colored material in the microcapsule on the latent image carrier onto a recording medium as the magnetic material disposed on the outer wall of the microcapsule substantially remains attracted to the magnetic latent image. A demagnetizing device demagnetizes the magnetic latent image on the latent image carrier, and a cleaner cleans off from the latent image carrier the magnetic material which substantially remained attracted to the magnetic latent image when the colored material was transferred onto the recording medium.

8 Claims, 2 Drawing Sheets

MAGNETIC RECORDING COLOR MICROCAPSULE AND A MAGNETIC RECORDING DEVICE USING THE SAME

This is a division of application Ser. No. 07/799,534, filed Nov. 27, 1991.

BACKGROUND OF THE INVENTION

The present invention relates to a magnetic recording color microcapsule and a magnetic recording device using such microcapsule and, more particularly, to a color microcapsule capable of recording optional color on a magnetic recording as well as a magnetic recording device used therefor.

A magnetic recording device adapted to visualize a magnetic latent image on a latent image carrier such as a magnetic drum by using a developer and transfer the same to a recording medium is suitable for recording a plurality of sheets by using an identical latent image since the magnetic latent image is stable. It also has a feature capable of providing a high level picture quality since the magnetic latent image has a high resolution power and, accordingly, it is a prospective recording means.

However, in the magnetic recording, since magnetic material is added both in the case of using a powdery magnetic toner or using a liquid maqnetic fluid, it inevitably causes, for example, black or brown color derived from iron, nickel or cobalt as the magnetic material, to bring about a problem that the color recording can not be conducted with an optional color to be expressed.

SUMMARY OF THE INVENTION

Accordingly, it is an object of the present invention to provide a magnetic recording color microcapsule capable of color recording and a magnetic recording device using such microcapsule.

DESCRIPTION OF THE PREFERRED EMBODIMENTS

The present invention will now be described specifically by way of a preferred embodiment while referring to the accompanying drawings.

An explanation will first be set forth of a magnetic recording color microcapsule.

Figure 1:
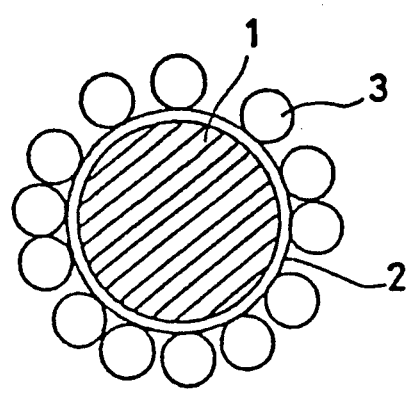
FIG. 1 is a schematic cross sectional view of a magnetic recording color microcapsule according to one embodiment of the present invention.

FIG. 1 shows a magnetic recording color microcapsule which includes an internal phase 1 having a color ink confined within an outer wall 2 and a magnetic material 3 deposited on the outer surface of the outer wall 2.

The internal phase 1 comprises a colored ink composed, for example, of a pigment or dye for providing a desired color mixed with a solvent or the like or such a colored ink mixed with a resin into a liquid or paste. Colored inks of various colors can be prepared by using, for example, inorganic or organic pigments such as yellow pigment, red pigment, purple pigment, blue pigment, green pigment or white pigment or dyes of various colors such as natural dyes or synthetic dyes. The colored ink can be aqueous-based or oil-based by selecting a solvent in accordance with the pigment or the dye.

For the outer wall 2, a polyurethane resin, a polyurea resin, styrene or the like may be used for instance. It is preferred that solvent systems for the internal phase 1 and the outer wall 2 have characteristics opposite to each other. That is, in the case of an aqueous ink, the outer wall 2 is preferably oily and, on the other hand, the outer wall 2 is preferably aqueous in a case of an oily ink. This can confine the ink always in the outer wall since the ink is not compatible with the outer wall.

As the magnetic material 3, known magnetic particles (magnetized particulate material) can be used, for example, elemental metals such as cobalt, iron and nickel, alloys or metal compounds.

The diameter of the magnetic material 3 is preferably about 1/10 the diameter of the outer wall 2, and the diameter of the microcapsule including as far as the outer side of the magnetic material 3 is preferably from 5 to 15 $\mu$m.

Various techniques have been known for covering the material with the outer wall and such known technique can be used also in the present invention. For instance, in a case of using an interfacial polycondensation method, a given pigment, dye or the like is mixed with a solvent, resin or the like to prepare the internal phase and, further, a polyisocyanate such as diisocyanate, triisocyanate or tetraisocyanate is mixed with the internal phase to form an oily phase liquid mixture (a mixture of the internal phase and an outer wall-forming material). Then, the oily phase liquid mixture is emulsified and dispersed in an aqueous solution containing a polyamine such as diamine or triamine and encapsulated by means of the interfacial polycondensation method. Subsequently, it is separated from the liquid phase, washed and then dried. Then, a particulate shape in which the outer wall of a polyurethane resin or polyurea resin is formed around the internal phase is obtained. Then, the outer wall is reinforced by applying heat treatment. For the method of covering the internal phase with the outer wall, various other methods can be used such as a phase separation method from an aqueous system or a phase separation method form an organic solvent system.

For depositing the magnetic material 3 on the particle comprising the internal phase 1 covered with the outer wall 2, for instance, mechanical and thermal energy mainly exerted as an impact shock is imparted to the particles and the magnetic material while dispersing them in a gas phase so that they impinge on each other to enforce and to secure the magnetic material 3 into the outer wall 2. Alternatively, the particles and the magnetic material may be statically charged each at a polarity different from other other, so that they attract each other thereby depositing the magnetic material and, subsequently, the surface of the outer wall 2 is melted by heating to secure the magnetic material. Further, a predetermined amount of particles and magnetic material are merely mixed in a mixer or the like to deposit the magnetic material on the outer wall. In this way, a microcapsule in which the magnetic material is deposited around the outer wall 2 according to the present invention can be obtained.

A description will now be set forth of a magnetic recording device using the magnetic recording color microcapsule.

Figure 2:
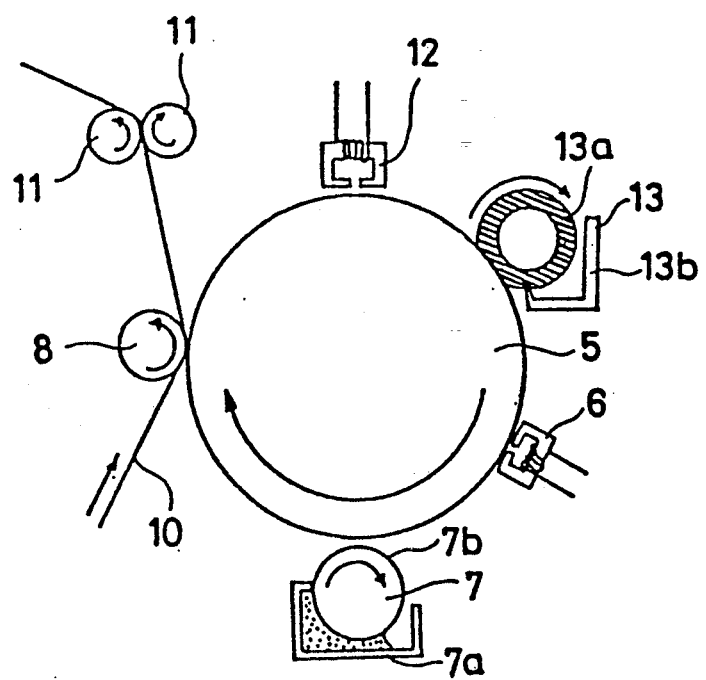
FIG. 2 is a schematic view of a magnetic recording device to which the color microcapsule according to the present invention is applied.

In FIG. 2, a latent image carrier 5 comprises a magnetic drum made of a cylindrical substrate and on the outer circumference of which is formed a magnetic material layer. The magnetic material layer comprises a powder of $Fe_2O_3$, $CrO_2$ or Fe (iron), Ni (nickel) and Co (cobalt) dispersed in a resin. The magnetic drum 5 rotates clockwise as shown in the drawing so that it successively passes through each of the steps disposed on the periphery of the magnetic drum 5.

A magnetic latent image writing means 6 comprises a magnetic head and it serves to write a magnetic pattern on the magnetic layer of the magnetic drum 5 to form a magnetic latent image.

A developing means 7 uses a magnetic roller as in the case of conducting magnetic recording by using the usual powdery magnetic toner. That is, a magnetic roller 7b is rotatably disposed in a vessel 7a and a permanent magnet is disposed in the magnetic roller 7b. The magnetic recording color microcapsule of the present invention stored in the vessel 7a is attracted by the permanent magnet and moved to the surface of the magnetic roller 7b and transferred to the magnetic latent image on the magnetic drum 5 at a position opposed to the magnetic drum 5.

A transfer means 8 uses a transfer roller, which is rotatably abutted against the magnetic drum 5 at a predetermined pressure. When a recording medium 10 is conveyed between the transfer roller 8 and the magnetic drum 5, the color microcapsule on the magnetic drum 5 abuts against the recording medium 10 and the recording medium 10 is urged by the transfer roller 8 against the magnetic drum 5. Thus, the outer wall 2 of the color microcapsule is collapsed, and the internal phase 1 at the inside is scattered to deposit on the recording medium 10.

A fixing means 11 comprises a pair of rollers 11 which abut against each other under a predetermined pressure.

A demagnetizing head 12 comprises a magnetic head like that of the magnetic latent image writing means 6 and it demagnetizes the magnetic pattern on the magnetic material layer of the magnetic drum 5.

A cleaning means 13 has a cylindrical sponge 13a and it removes the color microcapsule or the like remaining on the magnetic drum 5 and stores it in a vessel 13b.

In such an arrangement as described above, magnetic latent images are successively formed on the magnetic layer of the magnetic drum 5 by the magnetic latent image writing means 6, a portion on which the magnetic latent image is formed advances to the developing step, and the color microcapsule on the magnetic roller 7b transfers to the magnetic drum 5 since the magnetic material 3 around the outer wall 2 is attracted to the magnetic drum 5. Then, upon reaching the transfer step, the color microcapsule is collapsed between the recording medium 10 and the magnetic drum 5, so that the colored ink in the inside is scattered and deposits on and penetrates into the recording medium 10. Then, since the outer wall 2 and the magnetic material 3 deposited on the outside thereof are magnetically attracted by the magnetic latent image, they mainly remain on and move together with the magnetic drum 5.

In the case where the magnetic material is present integrally with the colored ink, when the colored ink transfers to the recording medium, the magnetic material also moves to the recording material simultaneously. However, in the present invention, since the magnetic material is present on the outside of the outer wall separately from the colored ink, even when the colored ink transfers to the recording medium, the outer wall and the magnetic material do not transfer very much to the recording medium. Accordingly, it is possible to obtain a desired color on the recording medium without being restricted by the color of the magnetic material.

The colored ink transferred to the recording medium 10 passes toward the fixing section together with a portion of the collapsed outer wall 2 which passes onto the side of the recording medium. In the fixing station they are pressurized between the fixing rollers 11 to cause the colored ink to further penetrate to the inside, and the recording medium 10 leaving the fixing means 11 is conveyed out of the device.

The magnetic latent image on the magnetic drum 5 after passing through the transfer means 8 is demagnetized by the demagnetizing means 12 and, further, the outer wall 2 and the magnetic material 3 or the like remaining on the magnetic latent image on the magnetic drum 5 are cleaned off at the position of the cleaning means 13. The magnetic drum 5 cleaned at the surface again reaches the magnetic latent image writing means 6 in which the magnetic latent image is formed and the next recording is conducted hereinafter in the same way as described above.

FIG. 2 shows one example of a magnetic recording device for conducting recording using a magnetic recording color microcapsule according to the present invention, but it is also possible to consider various devices for conducting the magnetic color recording by using the color microcapsule according to the present invention.

A description will now be set forth of a recording device conducting multi-color recording by using a colored microcapsule according to the present invention.

Figure 3:
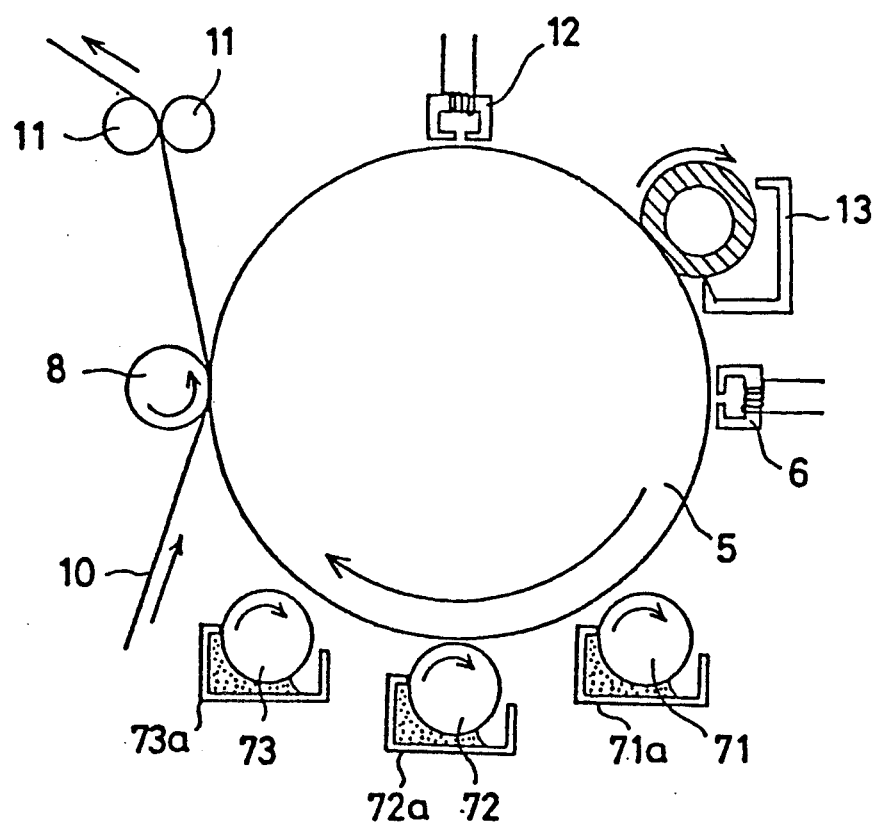
FIG. 3 is a schematic view of a magnetic recording device in a case where multi-color recording is conducted by using the color microcapsule according to the present invention.

In FIG. 3, identical constituents with those in FIG. 2 carry the same reference numerals. Developing means 71, 72 and 73 each using a magnetic roller are disposed along a magnetic drum 5. The developing means 71, 72 and 73 are, respectively, made accessible to and retractable from the magnetic drum 5. Microcapsules containing colored inks of different colors, for example, cyan, magenta and yellow or red, green and blue confined in the outer wall 2 are disposed in each of the vessels 71a, 72a and 73a, respectively.

Upon conducting recording for one of the colors with such an arrangement, the developing means 71 is first brought closer to the magnetic drum 5 while the other developing means 72 and 73 are kept apart from the magnetic drum 5. Then, the magnetic latent image information corresponding to the color of the color microcapsule from the developing means 71 is imparted by the writing means 6 to the magnetic drum 5 to form a magnetic latent image, and the magnetic latent image is developed by the developing means 71 and then transferred by the transfer means 8 to the recording medium 10. It is then fixed by the fixing means 11. Further, the magnetic latent image is demagnetized by the demagnetizing means 12 and the color microcapsule remaining on the magnetic drum 5 is removed by the cleaning means 13. Then, the developing means 71 is moved away from the magnetic drum 5 and the developing means 72 is brought closer to the magnetic drum 5.

Then, a magnetic latent image corresponding to the color of the color microcapsule disposed in the developing means 72 is now written by the writing means 6 again. The magnetic latent image is developed by the developing means 72 and then passes on to the transfer means 8. At the same time, the recording medium 10 which received the ink of the color microcapsule in the developing means 71 in the former cycle is again passed to the transfer means 8. The position of the recording medium 10 is aligned such that the developed magnetic latent image on the magnetic drum is situated at a predetermined position on the recording medium 10, and the ink of the color microcapsule from the developing means 72 is transferred onto the recording medium 10. Subsequently, by way of the same steps as described above, the developing means 72 is moved away while the developing means 73 is brought closer. The magnetic latent image is written and developed by the developing means 73, and the ink in the color microcapsule from the developing means 73 is transferred onto the recording medium 10 as described above. In this way, three different colors are recorded on the recording medium 10 and various colors can be provided on the recording medium 10 by the combination of the three colors.

It has been explained above that transfer is conducted on every cycle by the transfer means, but it can alternatively be conducted by making the transfer roller 8 and the cleaning means 13 accessible to and retractable from the magnetic drum 5, parting the transfer roller 8 and the cleaning means 13 initially from the magnetic drum 5, conducting the steps of writing magnetic latent images respectively from the magnetic latent image information by the writing means 6 and then developing them by respective developing means 71, 72 and 73 successively, approaching the transfer roller 8 in a state where all of the development has been completed and all of the three colors are deposited on the magnetic drum 5 and conducting transfer to the recording medium 10 at the transfer roller 8. The cleaning means 13 is brought closer after all the development has been completed and conducts cleaning for the magnetic drum 5 after transfer.

Although three developing means 71, 72 and 73 are used in FIG. 3, two-color recording using two developing means is also possible. Alternatively, multi-color recording can be conducted by using four or more developing means. Further, instead of multi-color recording, a color recording of multi gradation can be conducted by charging color microcapsules of an identical color with different gradations to the respective developing means.

According to the present invention, since a colored ink of a desired color is confined in the outer wall and the magnetic material is deposited on the outer side of the outer wall, the magnetic material mainly remains on the side of the latent image carrier in the transfer means, so that various colors can be obtained without being restricted by the color of the magnetic material. Further, since the colored ink is microencapsulated, magnetic rollers, etc. used in the case of the usual powdery magnetic toner can be used as the developing means and color recording can be conducted by a simple recording device. Further, by disposing a plurality of such developing means, multi-color recording can be obtained.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What is claimed is:

1. A magnetic recording device comprising:
   a latent image carrier,
   a writing means for imparting a magnetic latent image on said latent image carrier;
   a developing means for moving a magnetic recording color microcapsule onto said magnetic latent image carrier;
   said microcapsule comprising a colored material covered with an outer wall and a magnetic material disposed on an outer surface of said outer wall;
   a transfer means for transferring said colored material in said microcapsule on said latent image carrier onto a recording medium as said magnetic material disposed on said outer wall of said microcapsule substantially remains attracted to said magnetic latent image;
   a demagnetizing means for demagnetizing the magnetic latent image on said latent image carrier; and
   cleaning means for cleaning off from said latent image carrier said magnetic material which substantially remained attracted to said magnetic latent image when said colored material was transferred onto said recording medium.

2. A magnetic recording device according to claim 1, wherein the material of said outer wall remains substantially adhered to said magnetic latent image with said magnetic material when said colored material is transferred to said recording medium.

3. A magnetic recording device according to claim 2, wherein said cleaning means cleans off from said latent image carrier said outer wall material which remained adhered to said magnetic latent image when said colored material was transferred to said recording medium.

4. A magnetic recording device according to claim 1, wherein said developing means comprises a plurality of developing units each containing different microcapsules having a color material of different visual effects.

5. A magnetic recording device according to claim 4, wherein each of said developing units is movable toward and away from said latent image carrier such that when each unit is moved toward said latent image carrier, the microcapsules in said latter unit are moved onto said magnetic latent image carrier and when each unit is moved away from said latent image carrier, the microcapsules in said latter unit are not moved onto said magnetic latent image carrier.

6. A method of magnetic recording of colors comprising the steps of:
   imparting a magnetic latent image on a latent image carrier;
   providing a magnetic recording microcapsule in which a colored material is covered with an outer wall and a magnetic material is disposed on an outer surface of said outer wall;
   moving said microcapsules onto said latent image utilizing a developing unit;
   transferring the colored material in said microcapsule on said latent image onto a recording medium by crushing said microcapsule as said magnetic material disposed on said outer wall of said microcapsule substantially remains attracted to said magnetic latent image;

demagnetizing said magnetic latent image on said latent image carrier; and cleaning off from said latent image carrier said magnetic material which substantially remained on said magnetic latent image when said colored material was transferred onto said recording medium.

7. A method of magnetic recording of colors according to claim 6 further comprising utilizing a plurality of said developing units with each unit being operable to transfer different microcapsules onto said latent image with each of said different microcapsules having a color material of different visual effects;

shifting one of said developing units toward said latent image and moving the microcapsules in said one developing unit onto said latent image followed by said transferring step, said demagnetizing step and said cleaning step;

shifting said one developing unit away from said latent image; and shifting another of said developing units toward said latent image and moving the microcapsules in said other developing unit onto said latent image followed by repeating said transferring step, said demagnetizing step and said cleaning step.

8. A method of magnetic recording of colors according to claim 6 further comprising utilizing a plurality of said developing units with each unit being operable to transfer different microcapsules onto said latent image with each of said different microcapsules having a color material of different visual effects;

shifting one of said developing units toward said latent image and moving the microcapsules in said one developing unit onto said latent image;

shifting said one developing unit away from said latent image; and shifting another of said developing units toward said latent image and moving the microcapsules in said other developing unit onto said latent image followed by said transferring step, said demagnetizing step and said cleaning step.

* * * * *